US008851393B1

(12) United States Patent
Girgis

(10) Patent No.: US 8,851,393 B1
(45) Date of Patent: Oct. 7, 2014

(54) AIR CONDITIONER/HEATER SYSTEM

(76) Inventor: Wagih S. Girgis, Belleair Bluffs, FL (US)

( * ) Notice: Subject to any disclaimer, the term of this patent is extended or adjusted under 35 U.S.C. 154(b) by 897 days.

(21) Appl. No.: 12/653,220

(22) Filed: Dec. 10, 2009

(51) Int. Cl.
*B64D 13/00* (2006.01)
*F24D 19/10* (2006.01)
*G01M 1/38* (2006.01)

(52) U.S. Cl.
USPC ........................................ 236/91 D; 700/276

(58) Field of Classification Search
USPC ............................ 236/91 D, 51; 700/276, 278
See application file for complete search history.

(56) References Cited

U.S. PATENT DOCUMENTS

| | | | |
|---|---|---|---|
| 6,691,526 B2* | 2/2004 | Gether et al. | 62/238.7 |
| 8,091,795 B1* | 1/2012 | McLellan et al. | 236/51 |
| 2004/0117330 A1* | 6/2004 | Ehlers et al. | 705/412 |
| 2009/0302994 A1* | 12/2009 | Rhee et al. | 340/3.1 |

* cited by examiner

*Primary Examiner* — Chen Wen Jiang

(57) ABSTRACT

A bureau is adapted to monitor and forecast weather conditions and to generate forecasting data. A thermostat operatively coupled to an air conditioner/heater initiates and terminates both heating and cooling. A communication network operatively couples the bureau and the thermostat. Operational components within the thermostat are a first screen to display the actual temperature, a second screen to display the desired temperature, a mode switch having a primary position for cooling and a secondary position for heating, and an electronic controller for receiving input from the bureau and for operating the mode switch and for generating signals for the operation of the air conditioner/heater, the interpreting being based upon the generated forecasting data.

1 Claim, 2 Drawing Sheets

AIR CONDITIONER/HEATER SYSTEM

BACKGROUND OF THE INVENTION

1. Field of the Invention

The present invention relates to an air conditioner/heater control system and more particularly pertains to changing operational setting in an anticipatory manner in response to inputs from a plurality of sources, the changing being done in a safe, convenient manner.

2. Description of the Prior Art

The use of air conditioner/heater control systems of known designs and configurations is known in the prior art. More specifically, air conditioner/heater control systems of known designs and configurations previously devised and utilized for the purpose of changing operational setting are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe air conditioner/heater control system that allows changing operational setting in an anticipatory manner in response to inputs from a plurality of sources, the changing being done in a safe, convenient manner.

In this respect, the air conditioner/heater control system according to the present invention substantially departs from the conventional concepts and designs of the prior art, and in doing so provides an apparatus primarily developed for the purpose of changing operational setting in an anticipatory manner in response to inputs from a plurality of sources, the changing being done in a safe, convenient manner.

Therefore, it can be appreciated that there exists a continuing need for a new and improved air conditioner/heater control system which can be used for changing operational setting in an anticipatory manner in response to inputs from a plurality of sources, the changing being done in a safe, convenient manner. In this regard, the present invention substantially fulfills this need.

SUMMARY OF THE INVENTION

In view of the foregoing disadvantages inherent in the known types of air conditioner/heater control systems of known designs and configurations now present in the prior art, the present invention provides an improved air conditioner/heater control system. As such, the general purpose of the present invention, which will be described subsequently in greater detail, is to provide a new and improved air conditioner/heater control system and method which has all the advantages of the prior art and none of the disadvantages.

To attain this, the present invention essentially comprises First provided is a home air conditioner/heater. The home air conditioner/heater is adapted to heat a home in response to anticipated cold weather conditions and adapted to cool the home in response to anticipated hot weather conditions.

Next provided is a bureau, as for example The National Oceanic and Atmospheric Administration. The bureau is adapted to monitor and generate forecasts of weather conditions at locations around the world including a specific location of the home air conditioner/heater.

An overriding agency is next provided. The overriding agency is chosen from the class of overriding agencies including a federal government agency, a local government agency and a power company supplying power to facilities including the home air conditioner/heater.

Next provided is a thermostat. The thermostat is operatively coupled to the home air conditioner/heater to initiate and terminate heating by the home air conditioner/heater and to initiate and terminate cooling by the home air conditioner/heater.

A communication network is next provided. The communication network operatively couples the bureau and the agency and the thermostat. The communication network includes at least one communication channel chosen from the class of communication channels including land lines, cell links and satellites.

Lastly, operational components are provided within the thermostat. The operational components include a first screen and a second screen. The first screen displays the actual temperature at a location in proximity to the thermostat. The second screen displays the desired optimal temperature at the location in proximity to the thermostat. The second screen has buttons for changing the desired temperature.

The operational components also include a three position mode switch. The mode switch has a primary position for cooling, a secondary position for heating, and a tertiary position 46 for inactivation.

The operational components further include a two position fan switch. The fan switch has a normal position for automatic and inactivation of a fan. The fan switch also has a supplemental position for continuous running of the fan.

The operational components also include an electronic controller. The electronic controller receives input from the bureau and the agency and the fan switch. The electronic controller functions to control the fan switch and for generating signals for the operation of the air conditioner/heater. The generating of signals is based upon generated forecast data including anticipated temperature changes as well as anticipated changes in humidity and wind chill factor.

Finally, the operational components include a triple control assembly having a user button for controlling the thermostat and the air conditioner/heater independent of both the bureau and the agency. The triple control assembly further has a bureau button for controlling the thermostat and the air conditioner/heater solely by weather forecasts from the bureau independent of the agency and an user of the system. The triple controller also has an agency light for indicating the agency control of the thermostat and the air conditioner/heater independent of the bureau and the user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved air conditioner/heater control system which has all of the advantages of the prior art air conditioner/heater control systems of known designs and configurations and none of the disadvantages.

It is another object of the present invention to provide a new and improved air conditioner/heater control system which may be easily and efficiently manufactured and marketed.

It is further object of the present invention to provide a new and improved air conditioner/heater control system which is of durable and reliable constructions.

An even further object of the present invention is to provide a new and improved air conditioner/heater control system which is susceptible of a low cost of manufacture with regard to both materials and labor, and which accordingly is then susceptible of low prices of sale to the consuming public, thereby making such air conditioner/heater control system economically available to the buying public.

Even still another object of the present invention is to provide an air conditioner/heater control system for changing operational setting in an anticipatory manner in response to inputs from a plurality of sources, the changing being done in a safe, convenient manner.

Lastly, it is an object of the present invention to provide a new and improved air conditioner/heater control system utilizing a bureau adapted to monitor and forecast weather conditions and to generate forecasting data. A thermostat operatively coupled to an air conditioner/heater initiates and terminates both heating and cooling. A communication network operatively couples the bureau and the thermostat. Operational components within the thermostat are a first screen to display the actual temperature, a second screen to display the desired temperature, a mode switch having a primary position for cooling and a secondary position for heating, and an electronic controller for receiving input from the bureau and for operating the mode switch and for generating signals for the operation of the air conditioner/heater, the interpreting being based upon the generated forecasting data.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
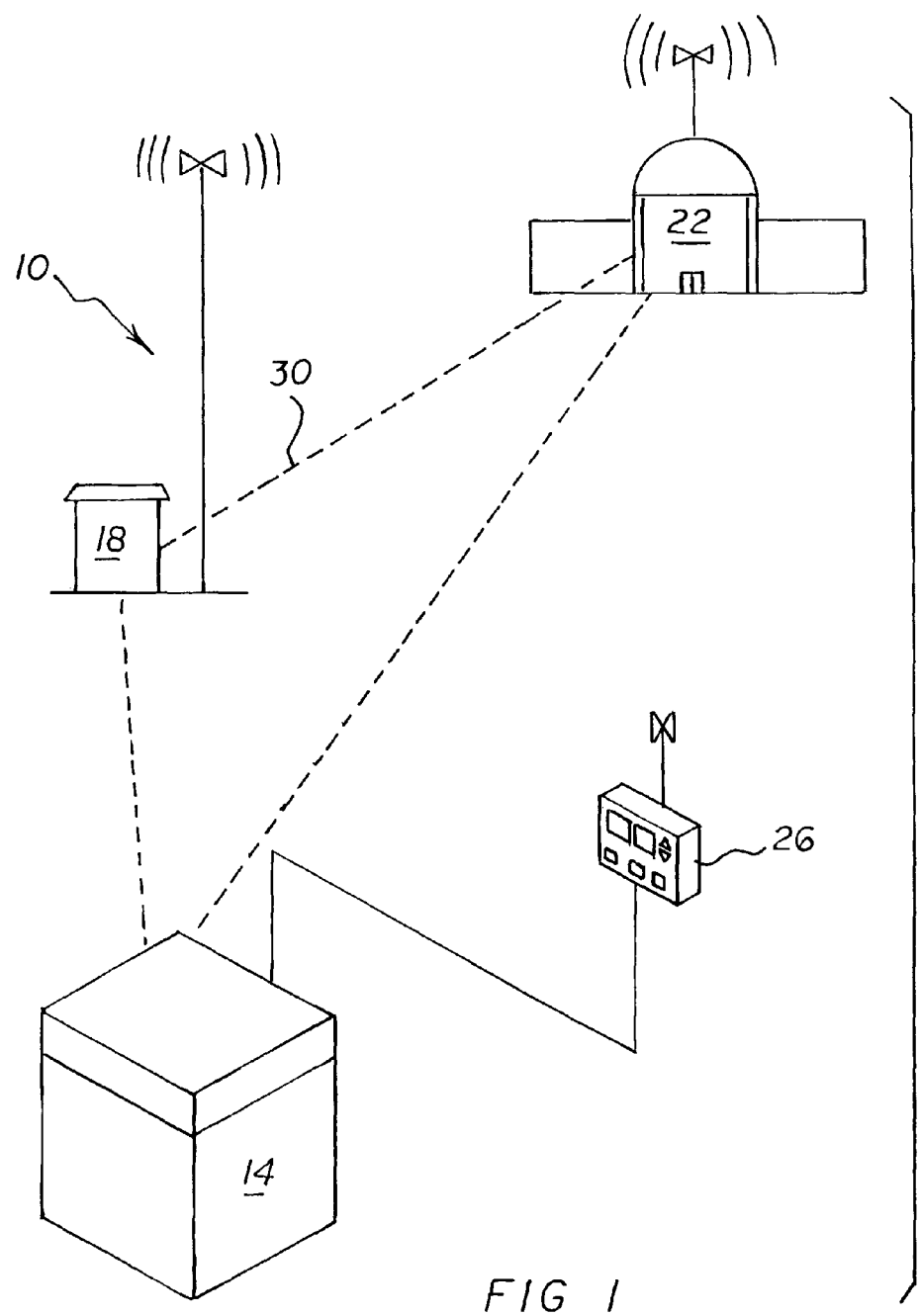
FIG. 1 is a perspective illustration of an air conditioner/heater control system constructed in accordance with the principles of the present invention
Figure 2:
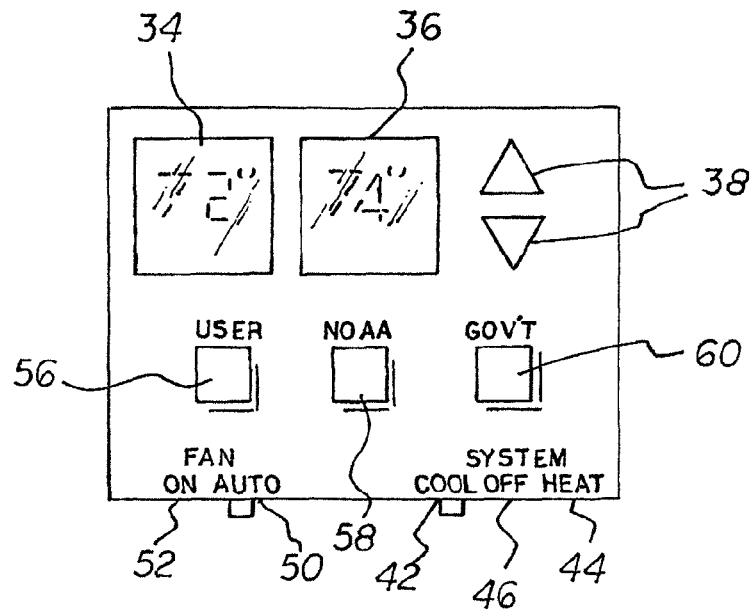
FIG. 2 is a front elevational view of the thermostat shown in FIG. 1.
Figure 3:
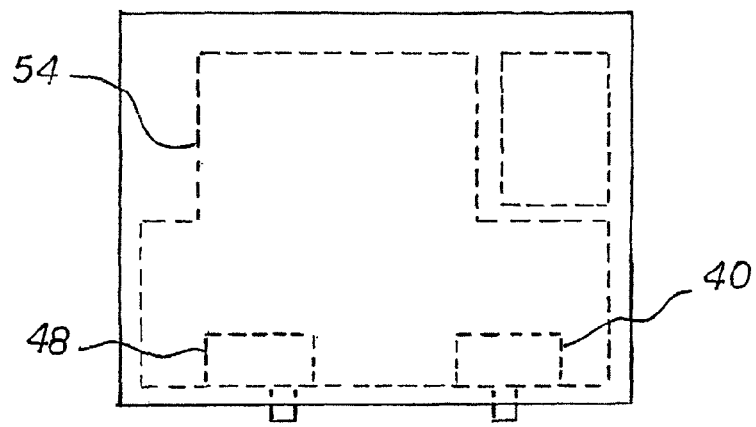
FIG. 3 is a schematic illustration of the thermostat of FIGS. 1 and 2.

With reference now to the drawings, and in particular to FIG. 1 thereof, the preferred embodiment of the new and improved air conditioner/heater control system embodying the principles and concepts of the present invention and generally designated by the reference numeral 10 will be described.

The present invention, the air conditioner/heater control system 10 is comprised of a plurality of components. Such components in their broadest context include an air conditioner/heater, a bureau, a thermostat, a communication network and operational components. Such components are individually configured and correlated with respect to each other so as to attain the desired objective.

First provided is a home air conditioner/heater 14. The home air conditioner/heater is adapted to heat a home in response to anticipated cold weather conditions and adapted to cool the home in response to anticipated hot weather conditions.

Next provided is a bureau 18, as for example The National Oceanic and Atmospheric Administration. The bureau is adapted to monitor and generate forecasts of weather conditions at locations around the world including a specific location of the home air conditioner/heater.

An overriding agency 22 is next provided. The overriding agency is chosen from the class of overriding agencies including a federal government agency, a local government agency and a power company supplying power to facilities including the home air conditioner/heater.

Next provided is a thermostat 26. The thermostat is operatively coupled to the home air conditioner/heater to initiate and terminate heating by the home air conditioner/heater and to initiate and terminate cooling by the home air conditioner/heater.

A communication network 30 is next provided. The communication network operatively couples the bureau and the agency and the thermostat. The communication network includes at least one communication channel chosen from the class of communication channels including land lines, cell links and satellites.

Lastly, operational components are provided within the thermostat. The operational components include a first screen 34 and a second screen 36. The first screen displays the actual temperature at a location in proximity to the thermostat. The second screen displays the desired optimal temperature at the location in proximity to the thermostat. The second screen has buttons 38 for changing the desired temperature.

The operational components also include a three position mode switch 40. The mode switch has a primary position 42 for cooling, a secondary position 44 for heating, and a tertiary position 46 for inactivation.

The operational components further include a two position fan switch 48. The fan switch has a normal position 50 for automatic and inactivation of a fan. The fan switch also has a supplemental position 52 for continuous running of the fan.

The operational components also include an electronic controller 54. The electronic controller receives input from the bureau and the agency and the fan switch. The electronic controller functions to control the fan switch and for generating signals for the operation of the air conditioner/heater. The generating of signals is based upon generated forecast data including anticipated temperature changes as well as anticipated changes in humidity and wind chill factor.

Finally, the operational components include a triple control assembly having a user button 56 for controlling the thermostat and the air conditioner/heater independent of both the bureau and the agency. The triple control assembly further has a bureau button 58 for controlling the thermostat and the air conditioner/heater solely by weather forecasts from the bureau independent of the agency and an user of the system. The triple controller also has an agency light 60 for indicating the agency control of the thermostat and the air conditioner/heater independent of the bureau and the user.

The present invention is also a thermostat for controlling an air conditioner/heater. The thermostat includes a first screen to display the actual temperature at a location in proximity to the thermostat and a second screen to display the desired optimal temperature at the location in proximity to the thermostat. The second screen has buttons for changing the desired temperature.

The thermostat also has a three position mode switch with a primary position for cooling and a secondary position for heating and a tertiary position for inactivation.

Also provided is a two position fan switch having a normal position for automatic and inactivation of a fan. The fan switch also has a supplemental position for continuous running of the fan.

A user button is provided for allowing a user to control the thermostat and the air conditioner/heater.

In addition, the thermostat includes a communication network operatively coupling the thermostat to a weather forecasting bureau. Operatively coupled to the communication network is a bureau button for controlling the air conditioner/heater and the thermostat including the mode switch, such controlling being done solely by weather forecasts from the bureau independent of the user.

Lastly provided in the thermostat is an agency button for controlling the air conditioner/heater and the thermostat including the mode switch, such controlling being done solely by an agency independent of the user and the bureau.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air conditioner/heater control system for changing operational settings in an anticipatory manner in response to inputs from a plurality of sources, the system comprising, in combination:

a home air conditioner/heater adapted to heat a home in response to anticipated cold weather conditions and adapted to cool the home in response to anticipated hot weather conditions;

a bureau adapted to monitor and generate forecasts of weather conditions at locations around the world including a specific location of the home air conditioner/heater;

an overriding agency chosen from the class of overriding agencies including a federal government agency, a local government agency and a power company supplying power to facilities including the home air conditioner/heater;

a thermostat operatively coupled to the home air conditioner/heater to initiate and terminate heating by the home air conditioner/heater and to initiate and terminate cooling by the home air conditioner/heater, a communication network operatively coupling the bureau and the overriding agency and the thermostat, the communication network including at least one communication channel chosen from the class of communication channels including land lines, cell links and satellites; and operational components within the thermostat, the operational components including a first screen to display an actual temperature at a location in proximity to the thermostat;

a second screen to display a desired optimal temperature at the location in proximity to the thermostat, the second screen having buttons for changing the desired optimal temperature;

a three position mode switch having a primary position for cooling and a secondary position for heating and a tertiary position for inactivation, a two position fan switch having a normal position for automatic and inactivation of a fan and a supplemental position for continuous running of the fan;

an electronic controller for receiving input from the bureau and the overriding agency and the fan switch and for controlling the fan switch and for generating signals for the operation of the air conditioner/heater, the generating of signals being based upon generated forecast data including anticipated temperature changes as well as anticipated changes in humidity and wind chill factor; and a triple control assembly including:

a user button for controlling the thermostat and the air conditioner/heater independent of both the bureau and the overriding agency;

a bureau button for controlling the thermostat and the air conditioner/heater solely by forecasts from the bureau independent of the overriding agency and a user of the system; and an agency light for indicating control by the overriding agency of the thermostat and the air conditioner/heater independent of the bureau and the user.

* * * * *